B. D. CHAMBERLIN.
BLOWPIPE RECEIVING DEVICE FOR GLASS BLOWING MACHINES.
APPLICATION FILED DEC. 18, 1912.
1,124,700.
Patented Jan. 12, 1915.
2 SHEETS—SHEET 1.
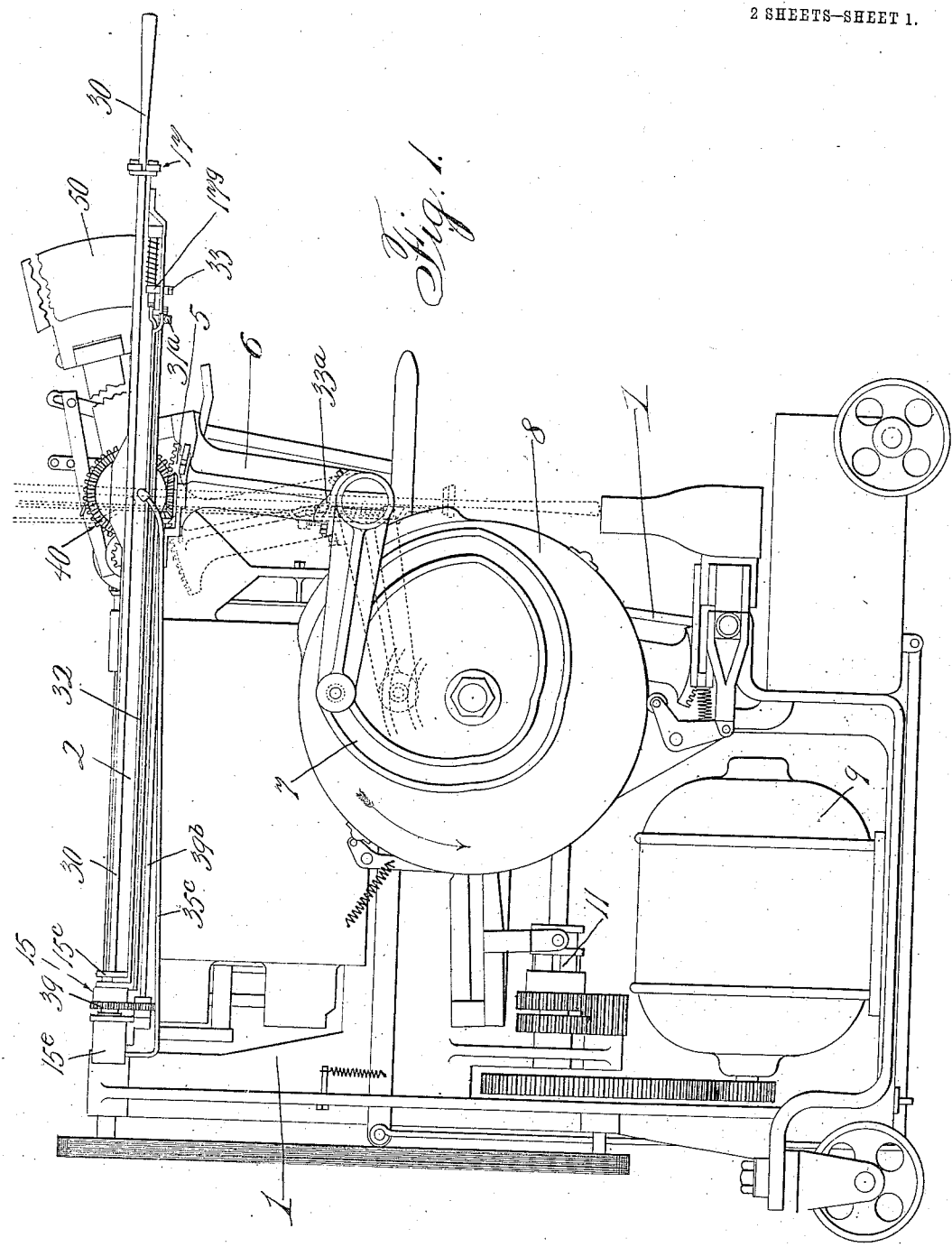

B. D. CHAMBERLIN.
BLOWPIPE RECEIVING DEVICE FOR GLASS BLOWING MACHINES.
APPLICATION FILED DEC. 18, 1912.
1,124,700.
Patented Jan. 12, 1915.
2 SHEETS—SHEET 2.
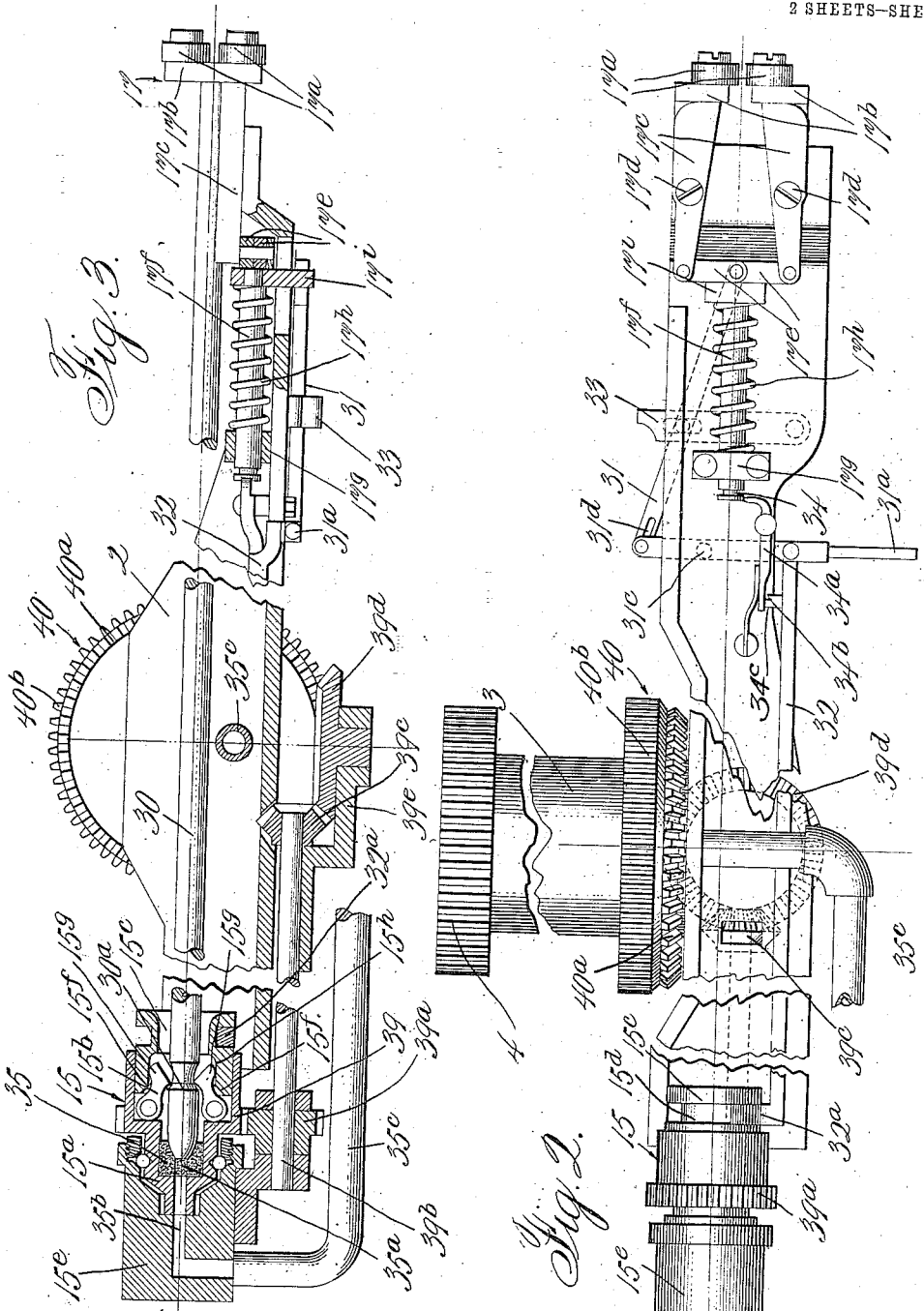

UNITED STATES PATENT OFFICE.

BENJAMIN DAY CHAMBERLIN, OF CORNING, NEW YORK, ASSIGNOR TO EMPIRE MACHINE COMPANY, OF PORTLAND, MAINE, A CORPORATION OF MAINE.

BLOWPIPE-RECEIVING DEVICE FOR GLASS-BLOWING MACHINES.

1,124,700. Specification of Letters Patent. Patented Jan. 12, 1915.

Original application filed January 13, 1911, Serial No. 602,532. Divided and this application filed December 18, 1912. Serial No. 737,402.

*To all whom it may concern:*

Be it known that I, BENJAMIN D. CHAMBERLIN, a citizen of the United States of America, and a resident of Corning, New York, have invented certain new and useful Improvements in Blowpipe-Receiving Devices for Glass-Blowing Machines, of which the following is a specification.

This invention relates to means for receiving, holding and releasing a removable blow pipe on which a mass of glass is carried, it being especially applicable to the type of machine shown in my prior application, Serial No. 602532, filed January 13, 1911, for apparatus for the production of glass articles, of which this case is a division. The apparatus shown in that application comprises a supporting frame movable through a limited vertical arc and adapted to receive a removable blow pipe, the frame having a substantially horizontal normal position in which the blow pipe is loaded, and is swung from such position to a vertical position in which molding and blowing occurs.

The invention forming the subject-matter of this application relates to the means for securing the removable blow pipe upon the frame in proper operative relation to the air supply thereon and for automatically releasing the blow pipe at certain times, but the invention here sought to be patented is not restricted in its use to the exact type of machine shown in my prior application.

My invention further consists in the construction, arrangement and combination of the several parts embodied in it as will be hereinafter more fully described and claimed.

Referring to the accompanying drawings in which corresponding parts are designated by corresponding marks of reference,—Figure 1 is a side elevation of the machine such as forms the subject-matter of my said original application, and having the invention here sought to be patented applied thereto. Fig. 2 is a plan view of a blow pipe frame having my invention applied thereto; and Fig. 3 is a side elevation thereof partly in section.

The machine to which this invention is shown as applied comprises a frame 1, having mounted, in the head thereof, a blow pipe frame 2, by means of a trunnion 3. On the trunnion is a circular rack 4 which is engaged by a rack sector 5 carried on the upper end of a bell crank 6, the horizontal end of which carries a wrist-roller working in a cam track 7 formed upon the face of a cam disk 8, which is driven by an appropriate motor 9, the shaping of the cam run being such that in the normal position of the parts, as is shown in Fig. 1, the blow pipe frame is substantially horizontal and is during a rotation of the cam disk swung through a limited vertical arc to position the glass upon the blow pipe carried thereby in proper operative relation to the mold, and is then returned to its normal position. The rotation of the cam disk from the motor is controlled in a proper sequence by means of clutch mechanism 11 not necessary to be here described, it being sufficient to say that the driving mechanism provides pauses with the blow pipe horizontal and vertical.

A blow pipe chuck 15 is mounted upon what may be termed the rear end of the blow pipe frame and consists of a block $15^e$ having mounted in its forward end, by ball bearings, a shell $15^a$, in which is pivoted a plurality of jaws $15^b$, the free ends of which project forwardly and which may be forced inwardly, toward the axial line of chuck, by a sliding collar $15^c$, to engage an annular groove $30^a$ in the upper end of the blow pipe 30, when the latter has been inserted therein by an attendant, which is done when the blow pipe frame is substantially horizontal. The rear inner edge of the collar is beveled as at $15^f$ and by contacting on its rear movement with the rounded outwardly projecting noses $15^g$ on the front ends of the jaws closes the latter upon the pipe with sufficient force to clamp it securely and to press it rearwardly against a packing 35 to be hereinafter described. The jaws are held in this clamping position by the inner cylindrical wall $15^h$ of the collar, which wall is normal to the arc in which the jaws swing and is by the final rearward movement of the collar brought upon the outside of the noses $15^g$.

The gather end of the blow pipe after its upper end has been placed in the chuck is inserted in a support 17 comprising four anti-friction rollers 17$^a$ mounted in pairs on the angular bent ends 17$^b$ of the levers 17$^c$, pivoted at 17$^d$ intermediate of their ends, upon the bottom web of the blow pipe frame, at the forward end thereof, the rear ends of such levers, being connected with each other by the toggle levers 17$^e$, which are also pivoted at their adjacent ends to the forward end of a rod 17$^f$, mounted in a guide 17$^g$ on the blow pipe frame, the rod being projected forwardly by a coiled spring 17$^h$, interposed between the guide and a block 17$^i$ fast on the rod, whereby the forward ends of the levers will be pressed together closing the rollers on the blow pipe. For the purpose of separating the pairs of rollers to insert the blow pipe there-between, the lower end of the block 17, projects through a slot in the bottom web of the blow pipe frame, and has connected thereto the forward end of a link 31, the rear end of which is connected to the inner end of a hand lever 31$^a$ pivoted intermediate of its length at 31$^c$ to the bottom web of the blow pipe frame, the opposite end of the lever extending outwardly from the side of the blow pipe frame, where it terminates in a handle, which when moved forwardly, will, through the connections described, separate the rollers. The hand lever has also connected thereto at its outer end a link 32, extending rearwardly and terminating at its rear end in a yoke 32$^a$ which engages in the groove 15$^d$ of the chuck collar 15$^c$, whereby the same movement of the hand lever 31$^a$ which separates the anti-friction rollers of the front pipe support will also cause a forward movement of the sleeve to release the upper end of the pipe, thus permitting the ready removal of the latter.

Under certain circumstances it may be desirable to at times free the lower end of the blow pipe so that it may be moved slightly in respect to the blow pipe frame to properly aline it with coöperated mechanisms, for instance, the mold, while holding the upper end of the pipe. In order to admit this when it is desired, the following construction may be used. A lever 33 is pivoted on the bottom surface of the web of the blowing frame near the forward edge thereof, which lever projects inwardly past the inner edge of the blow pipe frame, and is pivoted to the link 31 where it crosses the latter, and a cam 33$^a$ is fixed upon the upper surface of the hub of the bell crank on which cam, when the blow pipe frame moves into vertical position for blowing, the inner end of the lever is adapted to ride, being shifted thereby to retract the link 31, whereby the guide rollers will be separated being held in this position during the molding by the cam 33$^a$. This separation of the guide rollers at this time, due to the cause stated, does not however, result in a loosening of the blow pipe clutch, as the connection between the link 31 and the hand lever 31$^a$ is made by a slot 31$^d$ in the former. It is furthermore desirable, that when the blow pipe clutch and support have been actuated to release a blow pipe upon which an article has been finished, means be provided to restrain any tendency of the spring 17 to move them from this position until another pipe has been inserted, and this is accomplished by a groove 34 in the rear end of the rod 17$^b$, in which groove one end of a spring pressed trigger 34$^a$ is adapted to engage when the rod has been retracted. The opposite end of the trigger has an inclined stud 34$^b$ thereon which co-acts with a corresponding stud 34$^c$ on the link 32, whereby, when the link is shifted to shove the chuck collar rearwardly to lock a blow pipe in the chuck, the opposite end of the trigger will be drawn out of the seat on the rod and the latter released to be projected forwardly by the spring 17$^h$.

The chuck shell has a packing 35 in its rear end surrounding an axial aperture 35$^a$, the end of the blow pipe contacting against the packing, and the chuck block 15$^e$ has an air passage 35$^b$ registering with the aperture 35$^a$ and connected with an air pipe 35$^c$ which passes through the trunnion 3 of the blow pipe frame and is connected with proper mechanism for introducing blowing air. The chuck shell 15$^a$ has a gear 39 upon its periphery which is driven by a pinion 39$^a$ on the rear end of a shaft 39$^b$ mounted on the under side of the bottom web of the blow pipe frame and having a gear 39$^c$ on its forward end meshing with a beveled idler 39$^d$ mounted in a bracket 39$^e$ on the bottom web of the blow pipe frame. The idler is driven by the beveled gear 40$^a$ of the doubled face gearing 40 sleeved on the trunnion 3 of the blow pipe frame, the spur gearing 40$^b$ of the same being driven in any suitable manner to secure the rotation of the chuck.

From the construction above described, it will be seen that I have provided a blow pipe support adapted to receive a removable blow pipe and to be caused to engage the opposite ends thereof when desired to hold the same rigid and to simultaneously release such ends when it is desired to remove the blow pipe; and one in which only one end of the blow pipe may be released when desired.

The use of the double support for the blow pipe is especially desirable, when as in the apparatus forming part of my original application, the glass upon the blow pipe is to be subjected to a marvering action prior to the molding, during which marvering it must be held with considerable rigidity to produce the required result. In the accompanying drawings, I have shown such a marverer at 50 and in the action of the machine the blow pipe carrying frame is swung upwardly and downwardly to carry the glass on the blow pipe along the face of the marverer with a rolling action, whereby a shaping of the solid blank is obtained.

Inasmuch as this application has been filed as a division of my prior application Serial Number 602,532, in response to requirements of division by the Patent Office and for the purpose of containing only the claims upon blow-pipe receiving, holding and releasing mechanism shown in such application, failure to claim herein features other than those relating to such mechanisms is not to be taken as a disclaimer by me of such mechanisms, as I have claimed certain of such other features more or less broadly in my other applications, viz, Serial Number 602,532, before referred to, and Serial Numbers 491,812, filed April 23, 1909, 551,198, filed March 23, 1910, and 737,403, filed December 18, 1912.

Having thus described my invention, what I claim and desire to secure by Letters Patent is:—

1. In a glass blowing machine, the combination with a movable blow pipe frame adapted to receive a removable blow pipe and to move and position it in coöperative relation with other mechanism, and means for partly releasing the pipe from the frame before the completion of the action of such coöperating mechanism.

2. The combination with a blow pipe carrying frame adapted to receive and hold a removable blow pipe, of mechanism adapted to coöperate with the removable blow pipe, means for producing relative movement between the blow pipe frame and the coöperating mechanism, and means for partly releasing the pipe from the frame before the completion of the action of such coöperating mechanism.

3. In a glass blowing machine, the combination with a movable blow-pipe frame adapted to receive a blow-pipe and position it for molding, of a mold, and means for partially releasing the pipe from the frame before the completion of the molding.

4. In a glass blowing machine, the combination with a frame having devices for holding a blow pipe at two points in its length, of mechanism adapted to coöperate with the blow pipe, means for causing relative movement between the frame and the coöperating mechanism to bring them into coöperative relation with each other, and means for releasing one of the pipe-holding devices before the completion of the action of such coöperating mechanism.

5. In a glass blowing machine, the combination with a movable blow-pipe frame having devices for holding a blow-pipe at two points in its length, of a mold mechanism, means for moving the frame to place the pipe in molding position, and means for releasing the blow pipe from one of the pipe-holding devices before the completion of the molding.

6. In a glass blowing machine, the combination with a movable blow-pipe frame having devices for holding a blow-pipe at two points in its length, a marverer, a mold mechanism, means for moving the frame to marver the gather on the pipe contained therein and to present the marvered gather to the mold, and means for releasing the blow pipe from one of the pipe holding devices prior to the molding.

7. In a glass blowing machine, the combination with a blow pipe frame, of a chuck adapted to receive one end of the pipe, holding jaws adapted to engage the pipe near the opposite end thereof, a connection between the chuck and jaws whereby they may be simultaneously disengaged from the pipe, and means for temporarily disengaging the jaws from the pipe without disengagement of the chuck.

8. In a glass blowing machine, the combination with a blow-pipe frame, of a chuck adapted to receive one end of the pipe, holding jaws adapted to engage the pipe near the opposite end thereof, a connection between the chuck and jaws whereby they may be simultaneously disengaged from the pipe, a mold, means for moving the frame to present the gather on the pipe to the mold, and means for disengaging the jaws from the pipe before the completion of the molding without disengagement of the chuck.

9. In a glass blowing machine, the combination with a blow-pipe frame, of a chuck adapted to receive one end of the pipe, holding jaws adapted to engage the pipe near the opposite end thereof, a connection between the chuck and holding jaws whereby they may be simultaneously disengaged from the pipe, a mold, means for moving the frame to present the gather on the pipe to the mold, and means actuated by the movement of the frame for disengaging the jaws from the pipe prior to the molding without disengagement of the chuck.

10. In a glass blowing machine, the combination with a blow-pipe frame, of a chuck adapted to receive one end of the pipe, a support for the pipe near the opposite end thereof, a connection between the chuck and support whereby they may be simultaneously disengaged from the pipe, and means whereby the support may be disengaged from the blow-pipe without opening the chuck.

11. In a glass blowing machine, the combination with a blow-pipe frame, of a chuck at one end thereof adapted to receive a removable blow-pipe, spring pressed separable supports for the blow-pipe at the opposite end of the frame, means for simultaneously releasing the chuck and separating the supports, a latch for holding the supports separated, and means for simultaneously closing the chuck and releasing the latch.

12. In a blow-pipe support for a removable blow-pipe, the combination of a pair of pivoted levers, having angularly extending portions at one end, toggle levers connected to their opposite ends, a spring acting upon the toggle levers to cause the angularly extending portions to approach each other, a pair of guide rollers upon each of the extending ends, and means for bending the toggle levers to separate the rollers.

13. In a blow-pipe support for a removable blow-pipe, the combination of a pair of pivoted levers, having angularly extending portions at one end, toggle levers connected to their opposite ends, a spring acting upon the toggle levers to cause the angularly exteding portions to approach each other, a pair of guide rollers upon each of the extending ends, means for bending the toggle levers to separate the rollers, a latch for holding the rollers in their separated position, and means for releasing the latch.

14. A chuck for a removable blow-pipe comprising a block, a hollow shell mounted therein, pipe engaging jaws pivoted in the shell, a collar slidably mounted in the shell and having a beveled portion to engage the jaws with the pipe and a holding portion for the jaws which is normal to the direction of the movement of the jaws.

15. In a chuck for a glass blowing machine, the combination of a hollow shell, jaws radially movable therein and having rearward shoulders adapted to engage a shoulder upon the blow pipe, a collar slidably mounted in the shell having a beveled portion to press the jaws rearwardly against the shoulder on the blow pipe and having a holding portion for the jaws which is normal to the direction of movement of the jaws.

16. In a glass blowing machine, the combination with a blow-pipe frame and with a chuck for a removable blow-pipe mounted thereon and comprising a block, a hollow shell rotating therein, pipe-engaging jaws pivoted in the shell, and a collar slidably mounted in the shell to engage the jaws with the pipe, of a pipe support mounted on the opposite end of the frame and comprising a pair of pivoted levers having guide rollers thereon, a spring tending to close the rollers on the blow-pipe and a connection between the said levers and the collar of the chuck for simultaneously actuating the same to release the pipe.

17. In a glass blowing machine, the combination with a blow-pipe frame, and with a chuck for a removable blow-pipe mounted thereon and comprising a block, a hollow shell rotating therein, pipe engaging jaws pivoted in the shell, and a collar slidably mounted in the shell to engage the jaws with the pipe, of a pipe support mounted on the opposite end of the frame and comprising a pair of pivoted levers having guide rollers thereon, a spring tending to close the rollers on the blow-pipe, a link for separating the guide rollers, a rod for shifting the chuck collar, and a common actuator for the link and rod.

18. In a glass blowing machine, the combination with a blow-pipe frame and with a chuck for a removable blow-pipe mounted thereon and comprising a block, a hollow shell rotating therein, pipe-engaging jaws pivoted in the shell, and a collar slidably mounted in the shell to engage the jaws with the pipe, of a pipe support mounted on the opposite end of the frame and comprising a pair of pivoted levers having guide rollers thereon, a spring tending to close the rollers on the pipe, a latch for holding the guide rollers separated, a link for separating the guide rollers, a rod for shifting the chuck collar, a lever for retracting the link to separate the rollers and for shifting the chuck collar to release and engage the pipe, and means actuated by the movement of the lever to move the collar to engage the pipe for releasing the latch.

19. In a glass blowing machine, the combination with a blow-pipe frame and with a chuck for a removable blow-pipe mounted thereon and comprising a block, a hollow shell rotating therein, pipe-engaging jaws pivoted in the shell, and a collar slidably mounted in the shell to engage the jaws with the pipe, of a pipe support mounted on the opposite end of the frame and comprising a pair of pivoted levers having guide rollers thereon, a spring tending to close the rollers on the pipe, a link for separating the guide rollers, a rod for shifting the chuck collar, and a common actuator for the link and rod, and means for separating the rollers without movement of the chuck collar.

20. In a glass blowing machine, the combination with a blow-pipe frame, and with a chuck for a removable blow-pipe mounted therein and comprising a block, a hollow shell rotating therein, pipe-engaging jaws pivoted in the shell, and a collar slidably mounted in the shell to engage the jaws with the pipe, of a blow pipe support mounted on the opposite end of the frame and comprising a pair of pivoted levers having guide rollers thereon, a spring tending to close the rollers on the blow-pipe, a latch for holding the guide rollers separated, a link for separating the guide rollers, a rod for shifting the chuck collar, a lever for retracting the link to separate the rollers and to actuate the rod for shifting the chuck collar to release and engage the pipe, means for releasing the latch actuated by the movement of the lever to move the collar for engaging the pipe, and means for separating the rollers without movement of the chuck collar.

21. In a glass blowing machine, the combination with a blow-pipe frame, and with a chuck for a removable blow-pipe comprising a block, a hollow shell rotating therein, pipe-engaging jaws pivoted in the shell, a collar slidably mounted in the shell to engage the jaws with the pipe, of a blow-pipe guide mounted on the opposite end of the frame and comprising a pair of levers having guide rollers thereon, a spring tending to close the rollers on the blow-pipe, a link for separating the guide rollers, a rod for shifting the chuck collar, a common actuator for the link and rod, a latch for holding the jaws when separated by the actuator, and means for releasing the latch upon movement by the actuator of the chuck collar to engage the blow-pipe.

22. In a glass blowing machine, the combination with a glass working spindle, of mechanism cooperating with the glass upon the spindle, means for moving the spindle to present the glass thereon to the coöperating mechanism, and automatic means for releasing the spindle from the means for moving the spindle and surrendering its control to the coöperating mechanism.

In testimony whereof I have signed my name in presence of two witnesses.

BENJAMIN DAY CHAMBERLIN.

In the presence of—
 DEEPHINE KEAGLE,
 G. WILLIT DRAKE.